(12) United States Patent
Medley

(10) Patent No.: US 11,410,427 B2
(45) Date of Patent: Aug. 9, 2022

(54) VISION SYSTEM AND METHOD FOR A MOTOR VEHICLE

(71) Applicant: Arriver Software AB, Linkoping (SE)

(72) Inventor: Fredrik Medley, Linköping (SE)

(73) Assignee: Arriver Software AB, Linkoping (SE)

( * ) Notice: Subject to any disclaimer, the term of this patent is extended or adjusted under 35 U.S.C. 154(b) by 142 days.

(21) Appl. No.: 16/332,170

(22) PCT Filed: Sep. 12, 2017

(86) PCT No.: PCT/EP2017/072902
§ 371 (c)(1),
(2) Date: Mar. 11, 2019

(87) PCT Pub. No.: WO2018/050642
PCT Pub. Date: Mar. 22, 2018

(65) Prior Publication Data
US 2019/0205673 A1    Jul. 4, 2019

(30) Foreign Application Priority Data
Sep. 13, 2016    (EP) .................................... 16188484

(51) Int. Cl.
*G06V 20/58* (2022.01)
*G06V 20/56* (2022.01)
*B60Q 9/00* (2006.01)

(52) U.S. Cl.
CPC .............. *G06V 20/58* (2022.01); *G06V 20/56* (2022.01); *B60Q 9/008* (2013.01)

(58) Field of Classification Search
CPC .......... G06K 9/00805; G06K 9/00791; G06V 20/58; G06V 20/56; B60Q 9/008
See application file for complete search history.

(56) References Cited

U.S. PATENT DOCUMENTS

| | | | |
|---|---|---|---|
| 6,370,261 B1* | 4/2002 | Hanawa | .................. G06T 7/593 382/104 |
| 7,437,243 B2 | 10/2008 | Fujimoto | |
| 8,548,229 B2 | 10/2013 | Badino et al. | |

(Continued)

FOREIGN PATENT DOCUMENTS

| | | |
|---|---|---|
| EP | 3 002 709 A1 | 4/2016 |
| WO | WO 2010/091818 A2 | 8/2010 |

OTHER PUBLICATIONS

International Search Report and Written Opinion of PCT/EP2017/072902 dated Dec. 7, 2017.

(Continued)

*Primary Examiner* — Qun Shen
(74) *Attorney, Agent, or Firm* — Duane Morris LLP

(57) ABSTRACT

A vision system for detecting free space in front of a motor vehicle includes a mono imaging apparatus (11) adapted to capture images (30) from the surrounding of a motor vehicle, and an electronic processing device (14) adapted to perform image processing of images (30) captured by the mono imaging apparatus (11) in order to detect objects in the surrounding of a motor vehicle. The electronic processing device (14) is adapted to calculate a horizontal component of the optical flow (31), and to determine transitions (33, 35) between regions of essentially constant horizontal optical flow and regions of essentially non-constant horizontal optical flow.

13 Claims, 2 Drawing Sheets

(56) References Cited

U.S. PATENT DOCUMENTS

| | | | |
|---|---|---|---|
| 9,210,408 B2* | 12/2015 | Ooshima | H04N 13/211 |
| 9,305,219 B2 | 4/2016 | Ramalingam et al. | |
| 9,892,519 B2 | 2/2018 | Vejarano et al. | |
| 2006/0217886 A1* | 9/2006 | Fujimoto | G08G 1/165 |
| | | | 701/300 |
| 2007/0299596 A1* | 12/2007 | Moritz | G06T 7/80 |
| | | | 701/1 |
| 2011/0311108 A1 | 12/2011 | Badino et al. | |
| 2012/0133769 A1* | 5/2012 | Nagamine | G06T 7/246 |
| | | | 348/148 |
| 2013/0286205 A1* | 10/2013 | Okada | G06K 9/00805 |
| | | | 348/148 |
| 2015/0206015 A1 | 7/2015 | Ramalingam et al. | |
| 2016/0001704 A1* | 1/2016 | Nakasho | B60R 1/00 |
| | | | 701/36 |
| 2016/0178406 A1* | 6/2016 | Wang | G01C 15/06 |
| | | | 250/231.1 |
| 2017/0344836 A1* | 11/2017 | Prinet | G06K 9/4604 |
| 2017/0363741 A1* | 12/2017 | Send | H04N 5/335 |

OTHER PUBLICATIONS

Pfeiffer, David, et al. "Efficient Representation of Traffic Scenes by Means of Dynamic Stixels", Intelligent Vehicles Symposium (IV), 2010 IEEE, IEEE, Piscataway, NJ, USA, Jun. 21, 2010 (Jun. 21, 2010), pp. 217-224, XP031732275, ISBN: 978-1-4244-7866-8 and Abstract.

* cited by examiner

VISION SYSTEM AND METHOD FOR A MOTOR VEHICLE

CROSS-REFERENCE TO RELATED APPLICATIONS

This application is a 35 U.S.C. § 371 national phase of PCT International Application No. PCT/EP2017/072902, filed Sep. 12, 2017, which claims the benefit of priority under 35 U.S.C. § 119 to European Patent Application No. 16188484.6, filed Sep. 13, 2016, the contents of which are incorporated herein by reference in their entirety.

FIELD OF THE INVENTION

The invention relates to a vision system for detecting free space in front of a motor vehicle, including a mono imaging apparatus adapted to capture images from the surrounding of a motor vehicle, and an electronic processing device adapted to perform image processing of images captured by the mono imaging apparatus in order to detect objects in the surrounding of a motor vehicle. The invention also relates to a corresponding vision method.

Background U.S. Pat. No. 7,437,243 B2 discloses a vision system for a motor vehicle with a controller adapted to calculate a side direction velocity component from captured images, to detect a road boundary based upon the calculated side direction velocity component, and to detect a moving direction of an object in the captured images based upon a relationship between the road boundary and the object.

It is of interest, in mono camera systems for cars, to detect whether the area in front of the car is empty and therefore drivable or not.

Prior art approaches involve either reconstructing 3D point cloud, i.e. structure-from-motion, or comparing the optical flow with a theoretical value for a flat surface. The structure-from-motion approach requires the target objects to be stationary. The approach involving comparing the optical flow with a theoretical value for a flat surface is not always reliable.

An object underlying the present invention is to provide a vision system and method which provides a simple but reliable solution for detecting whether the area in front of the car is drivable or not in a mono camera setup.

Embodiments of the invention address the above objective with the features described herein. According to the invention, transitions between regions of essentially constant horizontal optical flow and regions of essentially non-constant horizontal optical flow are determined. The invention uses the fact that the horizontal component of optical flow is constant along a column in the region of a target on the road, regardless of whether the target is moving or stationary, whereas the horizontal component of optical flow is changing in image parts corresponding to the road itself. The invention does not require a prior flat surface in front of the car, or related information.

In many applications of the invention, it is advantageous to determine the world distance of the vehicle to a structure formed by the transitions, in order to have information how far the vehicle can go until it would reach a raised structure, or in other words, how much free space there is in front of the vehicle. In some embodiments of the invention, a flat road assumption can be used in the distance determination. In case a flat road assumption turns out to be not accurate enough, road profile information, for example from a satellite navigation system, can be used to determine the above mentioned distance.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
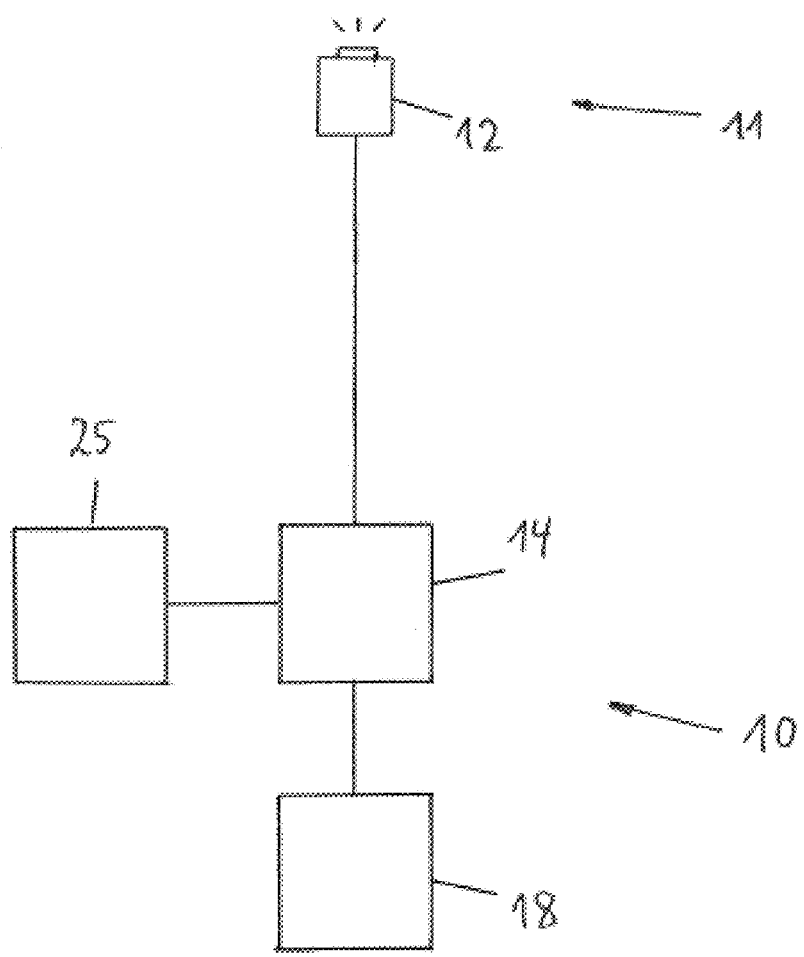
FIG. 1 shows a schematic diagram of a vision system of the present invention.

The vision system 10 is mounted in a motor vehicle and includes an imaging apparatus 11 for capturing images of a region surrounding the motor vehicle, for example a region in front of the motor vehicle. Here, the imaging apparatus 11 is a mono imaging apparatus 11 including one optical imaging device 12, in particular a camera, preferably operating in the visible and/or infrared wavelength range, where infrared covers near IR with wavelengths below 5 microns and/or far IR with wavelengths beyond 5 microns.

The imaging apparatus 11 is coupled to a data processing device 14 adapted to process the image data received from the imaging apparatus 11. The data processing device 14 is preferably a digital device which is programmed or programmable and preferably includes a microprocessor, microcontroller, digital signal processor (DSP), and/or a microprocessor part in a System-On-Chip (SoC) device, and preferably has access to, or includes, a data memory 25. The data processing device 14 may include a dedicated hardware device, like a Field Programmable Gate Array (FPGA) or an Application Specific Integrated Circuit (ASIC), or an FPGA and/or ASIC part in a System-On-Chip (SoC) device, for performing certain functions. The data processing device 14, or part of its functions, can be realized by a System-On-Chip (SoC) device including, for example, FPGA, DSP, ARM and/or microprocessor functionality. The data processing device 14 and the memory device 25 are preferably realised in an on-board electronic control unit (ECU) and may be connected to the imaging apparatus 11 via a separate cable or a vehicle data bus. In another embodiment, the ECU and one or more of the imaging devices 12 can be integrated into a single unit, where a one box solution including the ECU and all imaging devices 12 can be preferred. All steps from imaging, image processing to possible activation or control of driver assistance device 18 are performed automatically and continuously during driving in real time.

Image and data processing carried out in the processing device 14 advantageously includes identifying and preferably also classifying possible objects (object candidates) in front of the motor vehicle, such as pedestrians, other vehicles, bicyclists and/or large animals, tracking over time the position of objects or object candidates identified in the captured images, and activating or controlling at least one driver assistance device 18 depending on an estimation performed with respect to a tracked object, for example on an estimated collision probability. The driver assistance device 18 may in particular include a display device to display information relating to a detected object. However, the invention is not limited to a display device. The driver assistance device 18 may in addition or alternatively include a warning device adapted to provide a collision warning to the driver by suitable optical, acoustical and/or haptic warning signals; one or more restraint systems such as occupant airbags or safety belt tensioners, pedestrian airbags, hood lifters and the like; and/or dynamic vehicle control systems such as braking or steering control devices.

Figure 2:
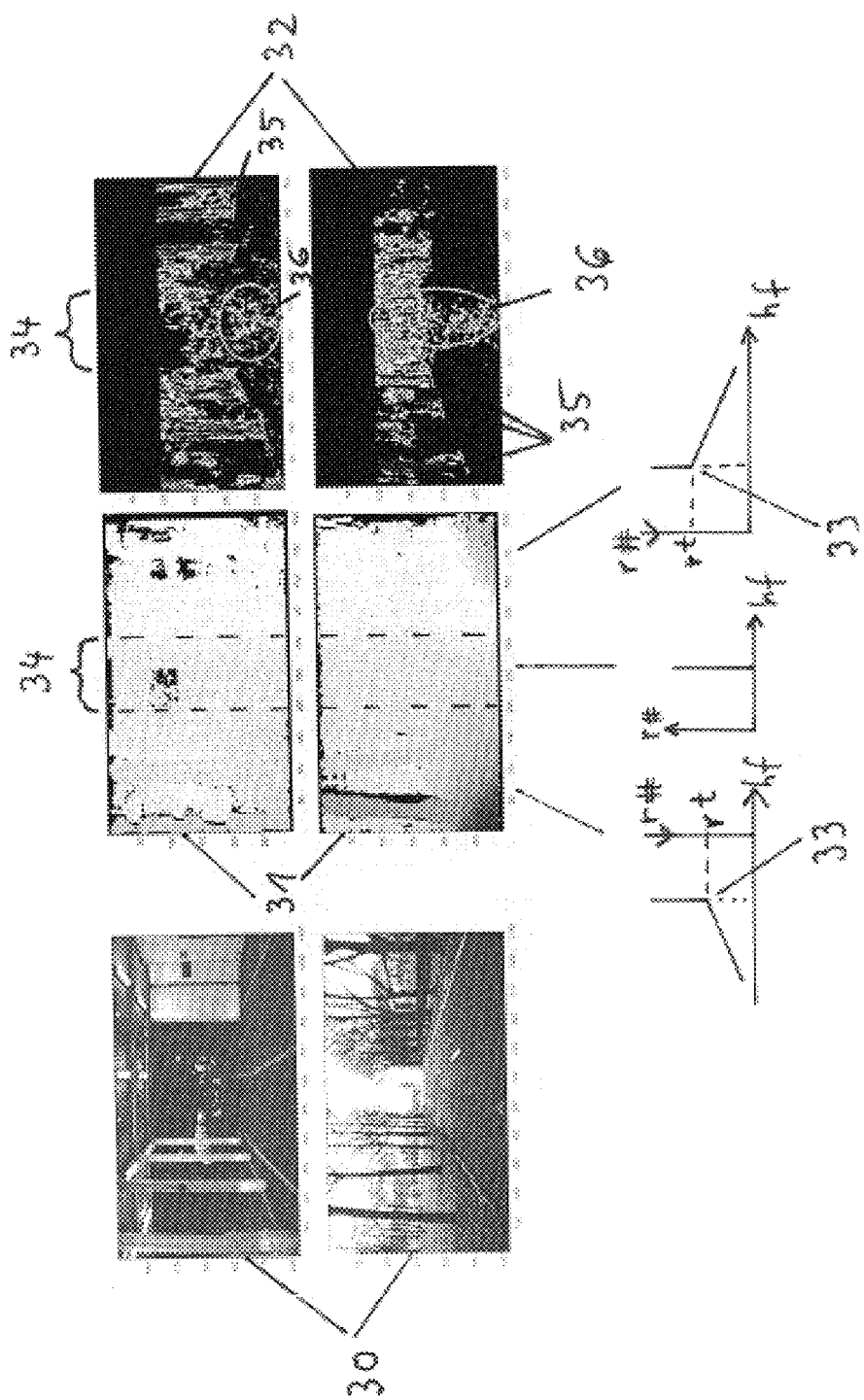
FIG. 2 shows raw and processed images for two different vehicle environments in order to illustrate the present invention.

In FIG. 2, a series of images is shown for explaining the invention in detail, for a situation in a car park (upper three images) and an overland avenue (lower three images). The left images 30 show the raw images as provided by the camera 12.

The center images 31 show the calculated horizontal flow for each pixel of the raw images. From the center images 31 it can be seen that the horizontal component of the optical flow has a characteristic pattern on the ground when moving forward. For a raised structure, i.e. a structure rising above the road or ground, like a tree or another moving car, the horizontal component of the optical flow is constant for a large part of an image column. The free space area in the image can therefore be detected by finding, for every image column, the row where the change or transition between constant and non-constant horizontal optical flow occurs.

This is also evident from the diagrams below the lower horizontal flow image 31. The left and right diagrams correspond to two exemplary image columns coinciding with a raised structure on the road or on the side of the road, like a tree in the avenue in the lower scenario of FIG. 2. The diagrams show the row number r # versus the horizontal flow component hf, where the row number in the present example increases from top to bottom. In the left and right diagrams, it can be seen that the value of the horizontal flow changes (increases or decreases, respectively) from the bottom of the image upwards, but at some point remains constant. This point indicated by row number rt corresponds to the transition point 33 between the raised structure and the road.

The middle diagram, however, does not show any transition point because the horizontal optical flow is approximately constant irrespective of a raised structure being present in the center region of the image or not. Therefore, the algorithm does not produce any meaningful result in the center region of the image, defined by a pre-determined fraction of all image columns lying in the center of the image. Consequently, a central image region 34 is preferably disregarded in the determination of the transition points 34. However, this lack of information is only present when the vehicle moves straight. When turning, the problematic central area 34, 36 moves to the left or right side in the image 30, and comes into the coverage of the free space determining algorithm.

As described above, the transitions points 33 are determined in a vertical image direction, preferably along single image columns, and more preferably for each image column, except for excluded image regions, in particular except for the central image region. However, it may be useful to combine the image information from a plurality of adjacent image columns, if the image information from one image column is not sufficient.

Preferably one or more border lines 35 are determined fitting to the determined transitions points 33. This is explained in the following on the basis of the right images 32 in FIG. 2. Generally, the border lines 35 may be straight lines, composed of straight lines, or curved lines. It is possible to have one border line 35 extending over the width of the image, or two border lines 35 in the left and right parts of the image.

The right images 32 in FIG. 2 show calculated images, which are referred to as discrimination images in the present application. In the discrimination image 32, the value of each pixel is a measure of whether this pixel belongs to a region of essentially constant horizontal optical flow, or to a region of essentially non-constant horizontal optical flow. For example, the discrimination image 32 can be a binary or black-white-image, where the pixel value is set to "white" if the algorithm estimates that the pixel belongs to a region of essentially constant horizontal optical flow, and the pixel value is set to "black" if the algorithm estimates that the pixel belongs to a region of essentially non-constant horizontal optical flow.

However, the discrimination image 32 can also for example be a grey-scale image, where each pixel can assume more than two values, giving a more differentiated probability of whether this pixel belongs to a region of essentially constant horizontal optical flow, or to a region of essentially non-constant horizontal optical flow.

An exemplary method for calculating the discrimination image 32 from the horizontal optical flow image 31 could involve, for each pixel, considering a number x of pixels above the pixel under consideration, a number y of pixels below the pixel under consideration, where y can be equal to or different from x, calculating a statistical deviation, like the standard deviation, of the horizontal optical flow values of the group of pixels including the x pixels above, the y pixels below and the pixel at the point of the pixel under consideration, and estimating the pixel under consideration to belong to a region of essential constant horizontal optical flow if the calculated standard deviation is below a pre-determined or calculated threshold. Other ways of calculating the discrimination image 32 from the horizontal optical flow image 31 are possible.

In the discrimination image 32, border lines 35 can be easily fitted to the determined transitions points 33. In the upper discrimination image 32, three border lines 35 are visible in the left part and two border lines 35 are visible in the right part of the image. In the lower discrimination image 32, three border lines 35 are visible in the left part of the image. The region below the border lines 35 provides a very clear estimate of the free space which is drivable by the vehicle.

Also in the discrimination image 32, the central areas 34, where no meaningful statement regarding transition points 33 or border lines 35 are possible, are marked by oval lines 36.

Furthermore, although it may be advantageous to determine transition points 33 and/or border lines 35 from a discrimination image 32, this is not mandatory. It is for example also possible to determine transition points 33 and/or border lines 35 directly in the horizontal optical flow image 31, for example by fitting curves like shown in the diagrams below the horizontal optical flow images 31 to each individual column or group of columns of the horizontal optical flow image 31. In this case, the calculation of the discrimination image 32 can be dispensed with, which saves corresponding processing resources.

Form the right images 32 of FIG. 2 it is evident that it may be advantageous to restrict the determination of transition points 34 and/or border lines 35 to a lower image part, like the part of the image that is below the horizon, or just the lower half of the image, which can save corresponding processing resources.

While the above description constitutes the preferred embodiment of the present invention, it will be appreciated that the invention is susceptible to modification, variation and change without departing from the proper scope and fair meaning of the accompanying claims.

The invention claimed is:

1. A vision system for detecting free space in front of a motor vehicle, comprising: a mono imaging apparatus adapted to capture images from the surrounding of the motor vehicle, and an electronic processing device adapted to perform image processing of images captured by the mono imaging apparatus in order to detect objects in the surrounding of the motor vehicle, and
wherein the electronic processing device is adapted to:
calculate an optical flow having a horizontal component,
determine transitions between regions of essentially constant horizontal optical flow and regions of essentially non-constant horizontal optical flow,
determine one or more border lines fitting to the transitions, and
determine the free space in front of the motor vehicle based on the one or more border lines.

2. The vision system as claimed in claim 1 further comprising, the electronic processing device is adapted to determine the transitions in a vertical image direction.

3. The vision system as claimed in claim 1 further comprising, the electronic processing device is adapted to determine a transition point for each of a plurality of image columns.

4. The vision system as claimed in claim 1 further comprising, the electronic processing device is adapted to calculate a discrimination image from a horizontal optical flow image, where a value of each pixel of the discrimination image provides a measure on whether the pixel belongs to the region of essentially constant horizontal optical flow or to the region of essentially non-constant horizontal optical flow, and to determine the transitions from the discrimination image.

5. The vision system as claimed in claim 4 further comprising, the discrimination image is calculated by, in the horizontal optical flow image, considering a number x of pixels above a pixel under consideration, a number y of pixels below the pixel under consideration, where y can be equal to or different from x, calculating a statistical deviation, or a standard deviation of the horizontal optical flow values of the number x of pixels above, and the number of y pixels below the pixel under consideration, and estimating the pixel under consideration to belong to the region of essential constant horizontal optical flow if the calculated statistical deviation or standard deviation is below a predetermined or calculated threshold.

6. The vision system as claimed in claim 1 further comprising the electronic processing device is adapted to disregard in the transitions determination of a central image region.

7. The vision system as claimed in claim 1 further comprising, the electronic processing device is adapted to restrict the transitions to a lower image part.

8. The vision system as claimed in claim 1 further comprising, the electronic processing device is adapted to determine a distance from the vehicle to a structure formed by the transitions.

9. The vision system as claimed in claim 8 further comprising, a flat road assumption is used in determination of the distance.

10. The vision system as claimed in claim 8 further comprising, that a road profile information, or road profile information from a satellite navigation system, is used in the distance determination.

11. A vision method for detecting a free space in front of a motor vehicle, comprising the steps of:
capturing images from the surrounding of the motor vehicle using a mono imaging apparatus,
performing an image processing of captured images in order to detect a free space in front of the motor vehicle,
calculating an optical flow having a horizontal component,
determining transitions between regions of essentially constant horizontal optical flow and regions of essentially non-constant horizontal optical flow,
determining one or more border lines fitting to the transitions, and
determining the free space in front of the motor vehicle based on the one or more border lines.

12. The vision system as claimed in claim 1, wherein the electronic processing device is adapted to determine the free space in front of the motor vehicle as corresponding to a region below the one or more border lines.

13. The vision method as claimed in claim 11, wherein the determining the free space in front of the motor vehicle includes determining the free space based on a region below the one or more border lines.

* * * * *